United States Patent
Huang et al.

(10) Patent No.: US 12,249,945 B2
(45) Date of Patent: *Mar. 11, 2025

(54) CONTROL METHOD, DEVICE, POWER SYSTEM AND ELECTRIC VEHICLE

(71) Applicant: CONTEMPORARY AMPEREX TECHNOLOGY (HONG KONG) LIMITED, Hong Kong (CN)

(72) Inventors: Xiaojian Huang, Ningde (CN); Zhimin Dan, Ningde (CN); Xianxi Pan, Ningde (CN); Xiyang Zuo, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 102 days.

This patent is subject to a terminal disclaimer.

(21) Appl. No.: 18/085,490

(22) Filed: Dec. 20, 2022

(65) Prior Publication Data

US 2023/0130303 A1 Apr. 27, 2023

Related U.S. Application Data

(63) Continuation of application No. PCT/CN2021/114980, filed on Aug. 27, 2021.

(30) Foreign Application Priority Data

Dec. 24, 2020 (CN) .......................... 202011554389.6

(51) Int. Cl.
*H02P 27/06* (2006.01)
*H02P 21/14* (2016.01)
(Continued)

(52) U.S. Cl.
CPC .............. *H02P 29/68* (2016.02); *H02P 21/14* (2013.01); *H02P 27/06* (2013.01); *B60L 58/10* (2019.02)

(58) Field of Classification Search
CPC .......... H02P 29/68; H02P 21/14; H02P 27/06; B60L 58/10
See application file for complete search history.

(56) References Cited

U.S. PATENT DOCUMENTS 5,936,378 A * 8/1999 Iijima ..................... B60L 50/51
318/807
6,407,531 B1 * 6/2002 Walters ................... H02P 6/085
318/807
(Continued)

FOREIGN PATENT DOCUMENTS

CN 101356721 A 1/2009
CN 102934355 A 2/2013
(Continued)

OTHER PUBLICATIONS

The first office action received in the counterpart Chinese application 202011554389.6, issued on May 18, 2024.
(Continued)

*Primary Examiner* — Rina I Duda
(74) *Attorney, Agent, or Firm* — Kilpatrick Townsend & Stockton LLP

(57) ABSTRACT

The embodiments of the present disclosure provide a control method, a device, a power system, and an electric vehicle. The method is applied to a motor controller of the power system. The power system further includes a power battery, a motor, and an inverter. The method includes: sending a first control signal to the inverter when a cell temperature of the power battery satisfies a preset heating condition for the power battery; where the first control signal is configured to control the inverter to convert an electricity provided by the power battery into an alternating current with a frequency changing randomly, and the alternating current with the frequency changing randomly is configured to supply power to the motor.

7 Claims, 8 Drawing Sheets

(51) Int. Cl.
*H02P 29/68* (2016.01)
*B60L 58/10* (2019.01)

(56) References Cited

U.S. PATENT DOCUMENTS

| | | | |
|---|---|---|---|
| 2006/0198426 A1 | 9/2006 | Partyka | |
| 2006/0290325 A1 | 12/2006 | Ashtiani | |
| 2011/0074326 A1 | 3/2011 | Su | |
| 2012/0112695 A1* | 5/2012 | Nishi | B60L 58/27 |
| | | | 320/109 |
| 2012/0323430 A1* | 12/2012 | Nakamura | B60L 50/51 |
| | | | 701/22 |
| 2013/0169206 A1 | 7/2013 | Suhama et al. | |
| 2015/0321573 A1* | 11/2015 | Sato | B60W 10/08 |
| | | | 903/903 |
| 2015/0364923 A1* | 12/2015 | Fine | H02J 50/12 |
| | | | 307/104 |
| 2018/0162379 A1 | 6/2018 | Mizuno et al. | |
| 2020/0212520 A1 | 7/2020 | Dan et al. | |
| 2020/0343848 A1 | 10/2020 | Lee et al. | |
| 2021/0043990 A1 | 2/2021 | Dan et al. | |
| 2021/0351732 A1 | 11/2021 | Shen | |

FOREIGN PATENT DOCUMENTS

| | | | |
|---|---|---|---|
| CN | 103560304 A | 2/2014 | |
| CN | 106058360 A | 10/2016 | |
| CN | 106330011 A | 1/2017 | |
| CN | 106494385 A | 3/2017 | |
| CN | 110048192 A | 7/2019 | |
| CN | 110932585 A | 3/2020 | |
| CN | 110962631 A | 4/2020 | |
| CN | 111216600 A | 6/2020 | |
| CN | 111347935 A | 6/2020 | |
| CN | 111354999 A | 6/2020 | |
| CN | 111439132 A | 7/2020 | |
| CN | 112078433 A | 12/2020 | |
| CN | 112103595 A | 12/2020 | |
| EP | 2579452 A1 | 4/2013 | |
| JP | 2000184731 A | 6/2000 | |
| JP | 2013187939 A | 9/2013 | |
| JP | 2014050170 A | 3/2014 | |
| JP | 2014072955 A | 4/2014 | |
| JP | 2020188555 A | 11/2020 | |
| WO | 2019244680 A1 | 12/2019 | |
| WO | 2020125770 A1 | 6/2020 | |
| WO | WO2020204584 A1 | 10/2020 | |

OTHER PUBLICATIONS

The first office action received in the counterpart European application 21908069.4, mailed Mar. 1, 2024.
Contemporary Amperex Technology Co., Limited, International Search Report and Written Opinion, PCT/CN2021/114980, Nov. 9, 2021, 11 pgs.
Contemporary Amperex Technology Co., Limited, International Search Report and Written Opinion, PCT/CN2021/073996, Sep. 24, 2021, 10 pgs.
Huang, Notice of Allowance, U.S. Appl. No. 17/529,917, filed Feb. 24, 2022, 16 pgs.
Huang, Notice of Allowance, U.S. Appl. No. 17/529,917, filed May 11, 2022, 17 pgs.
The extended European search report received in the corresponding EU application 21908069.4, mailed Jun. 16, 2023.

* cited by examiner

CONTROL METHOD, DEVICE, POWER SYSTEM AND ELECTRIC VEHICLE

CROSS REFERENCE TO RELATED APPLICATIONS

The present application is a continuation of PCT application No. PCT/CN2021/114980, entitled "CONTROL METHOD, DEVICE, POWER SYSTEM AND ELECTRIC VEHICLE" filed on Aug. 27, 2021, which claims the priority of Chinese patent application No. 202011554389.6 entitled "Control Method, Device, Power System and Electric Vehicle", filed on Dec. 24, 2020, all of which are incorporated herein by reference in their entirety.

TECHNICAL FIELD

The present disclosure relates to the field of battery technology, in particular to a control method, a device, a power system and an electric vehicle.

BACKGROUND

Due to a limitation of the material, a power battery may only exert the best performance stably under a rated ambient temperature. Therefore, the power battery needs to be heated to the rated ambient temperature when the electric vehicle is used in an area with a low ambient temperature.

In related art, the power battery is directly heated through a motor. Specifically, a closed loop is formed between the power battery and a stator winding of the motor, and electrical energy is stored on the stator winding of the motor. The stator winding of the motor applies an alternating current excitation to the power battery, so that the power battery is heated by its own internal resistance. Since the internal resistance of the power battery is usually large in an environment with low temperature, the power battery may be quickly heated to the rated ambient temperature.

However, in a process of heating the power battery by using the motor, noise is often excessive.

SUMMARY

Embodiments of the present disclosure provide a control method, applied to a motor controller of a power system. The power system further includes a power battery, a motor, and an inverter. The method includes: sending a first control signal to the inverter when a cell temperature of the power battery satisfies a preset heating condition for the power battery; where the first control signal is configured to control the inverter to convert an electricity provided by the power battery into an alternating current with a frequency changing randomly, and the alternating current with the frequency changing randomly is configured to supply power to the motor.

In some embodiments, before the sending the first control signal, the method further includes: randomly generating a plurality of set frequencies, and determining a duration of each of the plurality of set frequencies according to each of the plurality of set frequencies; determining a reference value sequence of a d-axis component according to the plurality of set frequencies and the duration of each of the plurality of set frequencies, and setting a reference signal sequence of a q-axis component as a null sequence; and generating the first control signal according to the reference value sequence of the d-axis component, the reference value sequence of the q-axis component, and motor parameters of the motor.

In the above embodiments, the plurality of set frequencies are randomly generated, the duration of each of the plurality of set frequencies is determined according to each of the plurality of set frequencies, and the first control signal is generated according to the plurality of set frequencies and the durations of the plurality of set frequencies, in order to control the inverter to convert a current of the power battery into the alternating current with the frequency changing randomly. By introducing new frequency components, an originally concentrated radial electromagnetic force can be evenly distributed to an entire stator, in this way, vibration noise during a heating process of the power battery can be reduced.

In some embodiments, the determining the duration of each set frequency according to each of the plurality of set frequencies includes: determining an entire cycle duration corresponding to a set frequency as a duration of the set frequency; or, determining a half cycle duration corresponding to a set frequency as a duration of the set frequency.

In the above embodiments, the duration of a set frequency is set to be the half cycle duration or the entire cycle duration corresponding to the set frequency, so as to facilitate a detection of the alternating current used to drive the motor and adjustment of the control signal in real time. In this way, effect of a noise suppression is ensured.

In some embodiments, the method further includes: sending a second control signal to the inverter when the cell temperature of the power battery satisfies the preset heating condition for the power battery; where the second control signal is configured to control the inverter to convert the electricity provided by the power battery into alternating current with an amplitude changing periodically, and the alternating current with the amplitude changing periodically is configured to supply power to the motor.

In the above embodiments, when the cell temperature of the power battery satisfies the heating condition for the power battery, the first control signal and the second control signal are sent to the inverter, and the inverter is controlled to convert the current of the power battery into the alternating current with the frequency changing randomly and the amplitude changing periodically, such that new frequency components are introduced. In this way, the vibration noise during the heating process for the power battery is further reduced.

In some embodiments, before the sending the second control signal, the method further includes: determining a plurality of set amplitudes and a duration of each of the plurality of set amplitudes according to heating parameters of the power battery and a maximum noise threshold value; determining a reference value sequence of a d-axis component according to the plurality of set amplitudes and the duration of each of the plurality of set amplitudes, and setting a reference value sequence of a q-axis component as a null sequence; and generating the second control signal according to the reference value sequence of the d-axis component, the reference value sequence of the q-axis component, and motor parameters of the motor.

In the above embodiments, when the cell temperature of the power battery satisfies a self-heating condition for the battery, the plurality of set amplitudes and the duration of each of the plurality of set amplitude are determined according to the heating parameters of the power battery and the maximum noise threshold value, so as to generate the second control signal according to the plurality of set amplitudes and the durations. Under the control of the first control signal and the second control signal, the inverter converts the current provided by the power battery into the alternating current with the frequency changing randomly and the amplitude changing periodically. By introducing more frequency components, the originally concentrated radial electromagnetic force can be evenly distributed to the entire stator, in this way, the vibration noise during the heating process of the power battery can be greatly reduced.

In some embodiments, the heating parameters include a heating rate and a heating duration.

In some embodiments, an amplitude reference value in the reference value sequence of the d-axis component is periodically increased or periodically decreased.

In some embodiments, the sending the first control signal to the inverter when the cell temperature of the power battery satisfies the preset heating condition for the power battery includes: sending the first control signal to the inverter when the cell temperature of the power battery is lower than a minimum operating temperature of the power battery, and the motor is in a non-driving operation state.

In the above embodiments, specifically, when the cell temperature of the power battery is less than the minimum operating temperature of the power battery, and an output torque of the motor is controlled to be approximately 0, that is, when the power battery needs to be heated to work properly and the motor is not rotating, the motor controller can send the first control signal to the inverter. In this way, influence to normal operation of the motor can be avoided, thereby the operation safety of the motor can be effectively improved.

In a second aspect, the present disclosure provides a control device, configured to send a first control signal to an inverter when a cell temperature of a power battery satisfies a preset heating condition for the power battery; where, the first control signal is configured to control the inverter to convert an electricity provided by the power battery into an alternating current with a frequency changing randomly, the alternating current with the frequency changing randomly is configured to supply power to the motor.

In a third aspect, the present disclosure provides a power system, including: a power battery, an inverter, a motor, and a motor controller. The motor controller is configured to perform the control method involved in the first aspect and alternative solutions.

In a fourth aspect, the present disclosure provides an electric vehicle, including a power system. The power system includes a power battery, an inverter, a motor, and a motor controller. The motor controller is respectively configured to perform the control method involved in the first aspect and alternative solutions.

The embodiments of the present disclosure provide a control method, a device, a power system, and an electric vehicle. When the cell temperature of the power battery satisfies the heating condition for the power battery, the first control signal is sent to the inverter. The first control signal is configured to control the inverter to convert the current of the power battery into the alternating current with the frequency changing randomly. The alternating current with the frequency changing randomly is configured to supply power to the motor. By introducing the new frequency components, the originally concentrated radial electromagnetic force can be evenly distributed to the entire stator. In this way, the vibration noise during the heating process of the power battery can be reduced. In addition, the first control signal and the second control signal are sent to the inverter, and the inverter is controlled to convert the current of the power battery into the alternating current with the frequency changing randomly and the amplitude changing periodically, thereby the new frequency components are introduced, and the vibration noise during the heating process for the power battery is further reduced.

BRIEF DESCRIPTION OF THE DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings may also be obtained in accordance with the drawings without any inventive effort.

Figure 1:
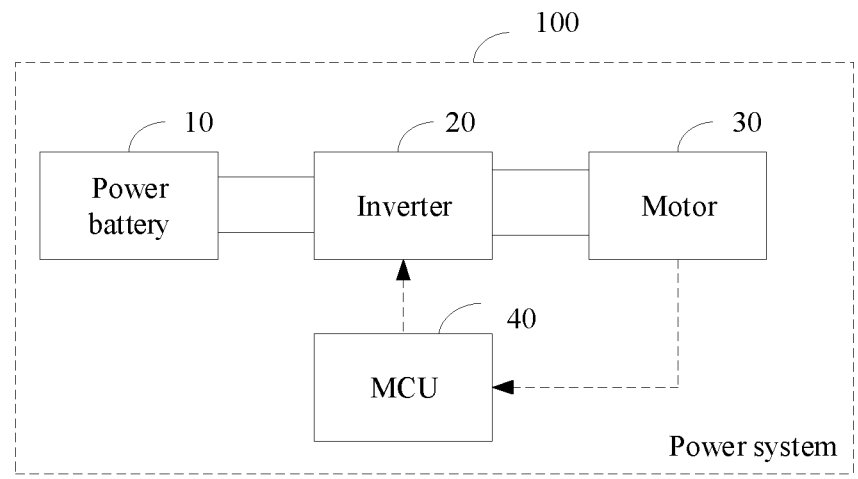
FIG. 1 is a schematic structural diagram of a power system provided by an embodiment of the present disclosure.

In the drawings, the drawings are not drawn to actual scale.

DETAILED DESCRIPTION

The implementations of the present disclosure are further described in detail below with reference to the accompanying drawings and embodiments. The detailed description of the following embodiments and drawings are used to exemplarily illustrate the principle of the present disclosure, but do not constitute a limitation to the scope of the present disclosure, that is, the present disclosure is not limited to the described embodiments.

In the description of the present disclosure, it should be noted that, unless otherwise specified, "a plurality of" means more than two; the orientation or positional relationship indicated by the terms "upper", "lower", "left", "right", "inside" and "outside" is only for the convenience of describing the present disclosure and simplifying the description, and does not indicate or imply that the device or element referred to must have a specific orientation, be constructed and operated in a specific orientation, and therefore cannot be understood as a limitation of the present disclosure. In addition, the terms "first", "second", "third", etc. are only used for description purposes, and cannot be understood as indicating or implying relative importance.

"Vertical" is not strictly vertical, but within the allowable range of error. "Parallel" is not strictly parallel, but within the allowable range of error.

The orientation words appearing in the following description are all directions shown in the figures, and do not limit the specific structure of the present disclosure. In the description of the present disclosure, it should also be noted that, unless otherwise clearly defined and limited, the terms "install", "connection", and "connected" should be understood in a broad sense. For example, it may be a fixed connection or a disassembly connection, or an integral connection; it may be directly connected or indirectly connected through an intermediate medium. For those of ordinary skill in the art, the specific meaning of the above-mentioned terms in the present disclosure may be understood according to specific circumstances.

An electric vehicle refers to a vehicle powered by a power battery. As shown in FIG. 1, a power system 100 of the electric vehicle includes a power battery 10, an inverter 20, a motor 30, and a motor controller unit (MCU) 40. The motor 30 may be a permanent magnet motor. A positive electrode and a negative electrode of the power battery 10 are connected to a direct current side of the inverter 20, and an alternating current side of the inverter 20 is connected to a stator winding of the motor 30. The power battery 10 supplies power to the motor through the inverter 20. The MCU 40 is provided with a plurality of input terminals for receiving operating status data of the motor and sending a motor control signal. The MCU 40 generates a pulse width modulation (PWM) signal according to the motor control signal, the operating status data of the motor, and operating status data of the power battery, and controls the current and voltage provided to the motor 30 by the inverter 20, so as to control a rotating speed of the motor 30 and realize a speed control of the vehicle.

Figure 2:
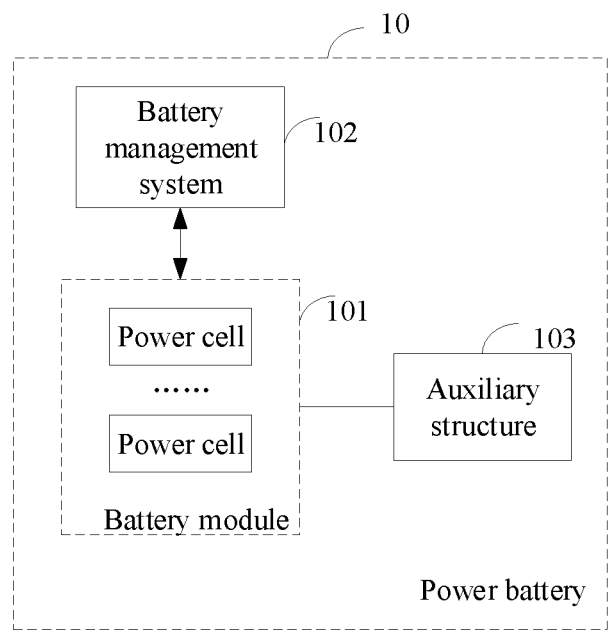
FIG. 2 is a schematic structural diagram of a power battery provided by an embodiment of the present disclosure.

As shown in FIG. 2, the power battery 10 includes a battery module 101, a battery management system (BMS) 102, and an auxiliary structure 103. Herein, the battery module 101 is formed by a plurality of power cells in series and/or parallel, and the cells are a core component of the power battery and a source of the electrical energy provided by the power battery. Main functions of the battery management system 102 are to perform a charge and discharge management, a high voltage control, a battery status evaluation, a battery data collection, a battery protection, and a battery thermal management. The auxiliary structure 103 generally includes an external frame, an electrical connection device, an insulating component, and the like. The external frame plays a role of protecting and supporting the battery module, the electrical connection device plays a role of connecting other electrical equipment, such as connecting with the inverter, and the insulating component plays a role of insulation protection.

Herein, the thermal management function of the battery management system 102 is used to ensure that the power battery works within a suitable temperature range. The thermal management function is mainly to achieve an accurate measurement and monitoring of a battery temperature, so as to perform an effective heat dissipation when the temperature of the battery module is too high, a rapid heating under a low temperature condition, and ensure a uniform distribution of a temperature field of the battery module. Herein, the rapid heating under the low temperature condition refers to: when being used in an area where a temperature of the cells is low, the power battery needs to be heated to a rated cell temperature so that the power battery may stably exert the best performance.

Existing heating methods for power battery may include an indirect heating method and a direct heating method. The indirect heating method refers to arranging a heat source outside the power battery for heating. The indirect heating method may include an air heating, a liquid heating, and a heating film heating, and the like. A heating rate of the battery varies depending on different heating sources. Since a heat loss may occur on a heat transfer medium when the battery is heated by an external heat source, an efficiency of the indirect heating method is low.

The direct heating method refers to heating the power battery inside. Herein, the common direct heating method is heating through internal resistance. Specifically, a motor rotor is fixed, and the PWM signal is input to a control terminal of the inverter, the power battery and the stator winding form a closed loop circuit, and the stator winding stores electric energy. Due to an inductance characteristic of the stator winding, the stator winding provides the alternating current to the battery, and the power battery is heated by the alternating current flowing through its internal resistance. Since the internal resistance of the power battery is relatively large in a low temperature environment, a heating efficiency of the power battery is high.

However, for the existing heating method by using the internal resistance of the power battery, when the motor provides a heating current to the power battery, the stator winding is used as an energy storage element to realize an alternating current on a bus bar. The above method changes a magnetic field distribution of the motor under a normal operation condition and brings an unbalanced force inside the motor, which is liable to cause vibration and noise on the motor, as a result, a NVH three-phase indicator of the electric vehicle cannot up to a standard. Herein, NVH, the abbreviation of noise, vibration and harshness, is an important indicator of the comfort of a vehicle.

To solve the above technical problems, the embodiments of the present disclosure provide a control method, a device, a power system, and an electric vehicle. The inventive concept of the present disclosure is to control a q-axis current or a q-axis voltage to 0, and apply the voltage or current to a d-axis, so that an output torque of the motor is 0, and use an inductance of the motor for energy storage, to realize a self-heating function of the battery. On the basis of controlling a d-axis voltage or a d-axis current of the motor to be a sine wave, additional current harmonic components may be introduced by making a frequency of the d-axis voltage or d-axis current to change randomly. In this way, a radial electromagnetic force of the motor can be evenly distributed on the stator under a self-heating condition of the battery, thereby the noise of the motor under the self-heating condition can be reduced. In addition, by randomly changing the frequency of the d-axis voltage or d-axis current, and periodically changing an amplitude of the d-axis voltage or d-axis current, more current harmonic components can be introduced. In this way, the radial electromagnetic force can be evenly distributed throughout the stator, and the vibration and noise during the heating process of the power battery can be greatly reduce.

An embodiment of the present disclosure provides a control method, the control method is applied to a motor controller unit MCU of a power system shown in FIG. 1. The control method includes: sending, by the MCU, a first control signal to an inverter when a cell temperature of a power battery satisfies a preset heating condition for the power battery. Herein, the first control signal is configured to control the inverter to convert an electricity provided by the power battery into an alternating current with a frequency changing randomly, and the alternating current with the frequency changing randomly is configured to supply power to the motor.

Figure 3:
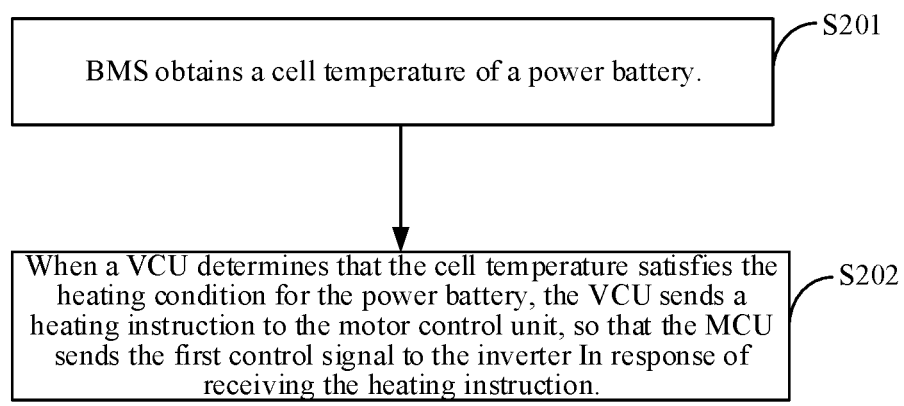
FIG. 3 is a flow chart of a control method provided by an embodiment of the present disclosure.

As shown in FIG. 3, an embodiment of the present disclosure provides a control method, the control method is applied to the power system shown in FIG. 1, and the control method includes the following steps.

In S201, a BMS obtains a cell temperature of the power battery.

Herein, a temperature sensor is deployed inside the power battery to monitor the cell temperature of the power battery in real time, and the temperature sensor may transmit a detected cell temperature to the BMS.

In S202, when a vehicle control unit (VCU) determines that the cell temperature satisfies the heating condition for the power battery, the VCU may send a heating instruction to the MCU, and the MCU may send the first control signal to the inverter in response of receiving the heating instruction.

Herein, the heating condition for the power battery includes that the cell temperature of the power battery is lower than a minimum operating temperature. If the cell temperature of the power battery is lower than the minimum operating temperature, it means that the cell temperature of the power battery satisfies the heating condition for the power battery. If the cell temperature of the power battery is higher than or equal to the minimum operating temperature, it means that the cell temperature of the power battery does not satisfy the heating condition for the power battery.

In some embodiments, when the VCU determines that the cell temperature satisfies the heating condition for the power battery and the motor is in a non-driving operation state, the VCU may send the heating instruction to the MCU. Alternatively, when the VCU determines that the cell temperature is lower than the minimum operating temperature and the motor is in the non-driving state, the VCU may send the heating instruction to the MCU.

The first control signal is configured to control the inverter to convert the current provided by the power battery into the alternating current with the frequency changing randomly, and the alternating current with the frequency changing randomly is configured to supply power to a permanent magnet motor, so that a self-heating may be obtained by the power battery by using its own resistance.

In the control method provided in this embodiment of the present disclosure, when the cell temperature of the power battery satisfies a self-heating condition for the battery, the first control signal is generated so that the inverter may convert the current provided by the power battery into the alternating current with the frequency changing randomly. By introducing new frequency components, an originally concentrated radial electromagnetic force can be evenly distributed on an entire stator, in this way, vibration and noise during a heating process of the power battery can be reduced.

Another embodiment of the present disclosure provides a control method, the control method is applied to a power system shown in FIG. 1, and the control method includes the following steps.

In S301, a BMS obtains a cell temperature of a power battery.

Herein, a temperature sensor is deployed inside the power battery to monitor the cell temperature of the power battery in real time, and the temperature sensor may transmit a detected cell temperature to the BMS.

In S302, when a VCU determines that the cell temperature satisfies a heating condition for the power battery, the VCU may send a heating instruction to a MCU, in response of receiving the heating instruction, the MCU may randomly generate a plurality of set frequencies, and determine a duration of each of the plurality of set frequency according to each of the plurality of set frequency.

Herein, when the cell temperature is less than a minimum operating temperature of the power battery, the plurality of set frequencies are randomly generated. The plurality of set frequencies are frequencies of the current passing through a motor, that is, an alternating current with the plurality of set frequencies is used to supply power to the motor.

As one of the specific ways to determine the duration of each of the plurality of set frequencies, an entire cycle duration corresponding to a set frequency is determined as the duration of the set frequency. When a set frequency is f, the entire cycle duration corresponding to the set frequency is 1/f, that is to say, each of the plurality of set frequencies lasts for one cycle duration.

As another specific way to determine the duration of each of the plurality of set frequencies, a half-cycle duration corresponding to a set frequency is determined as the duration of the set frequency. When a set frequency is f, the half-cycle duration corresponding to the set frequency is ½f, that is to say, each of the plurality of set frequencies lasts for the half-cycle duration.

In S303, the MCU determines a reference value sequence of a d-axis component according to the plurality of set frequencies and the duration of each of the plurality of set frequencies, and sets a reference signal sequence of a q-axis component as a null sequence.

Herein, when the randomly generated plurality of set frequencies are $f1, f2, \ldots, fn$, the duration corresponding to the set frequency $f1$ is $t11$, the duration corresponding to the set frequency $f2$ is $t12, \ldots$, and the duration corresponding to the set frequency $fn$ is $t1n$.

The reference value sequence of the d-axis component includes a plurality of reference values, and each of the plurality of reference values includes an amplitude reference value component, a frequency reference value component, and a duration reference value component. The amplitude reference value component may also be any value $I1$, the frequency reference value component is a set frequency, and the duration reference value component is the duration corresponding to the set frequency. That is, the reference value sequence of the d-axis component is $\{(I1, f1, t11), (I1, f2, t12), \ldots, (I1, fn, t1n)\}$.

The reference value sequence of the q-axis component includes a plurality of reference values, and each of the plurality of reference values includes an amplitude reference value component, a frequency reference value component, and a duration reference value component. The amplitude reference value component, the frequency reference value component, and the duration reference value component are all null. That is, the reference value sequence of the q-axis component is $\{(0, 0, 0), (0, 0, 0), \ldots, (0, 0, 0)\}$.

In S304, the MCU generates a first control signal according to the reference value sequence of the d-axis component, the reference value sequence of the q-axis component, and motor parameters of a permanent magnet motor.

Figure 4:
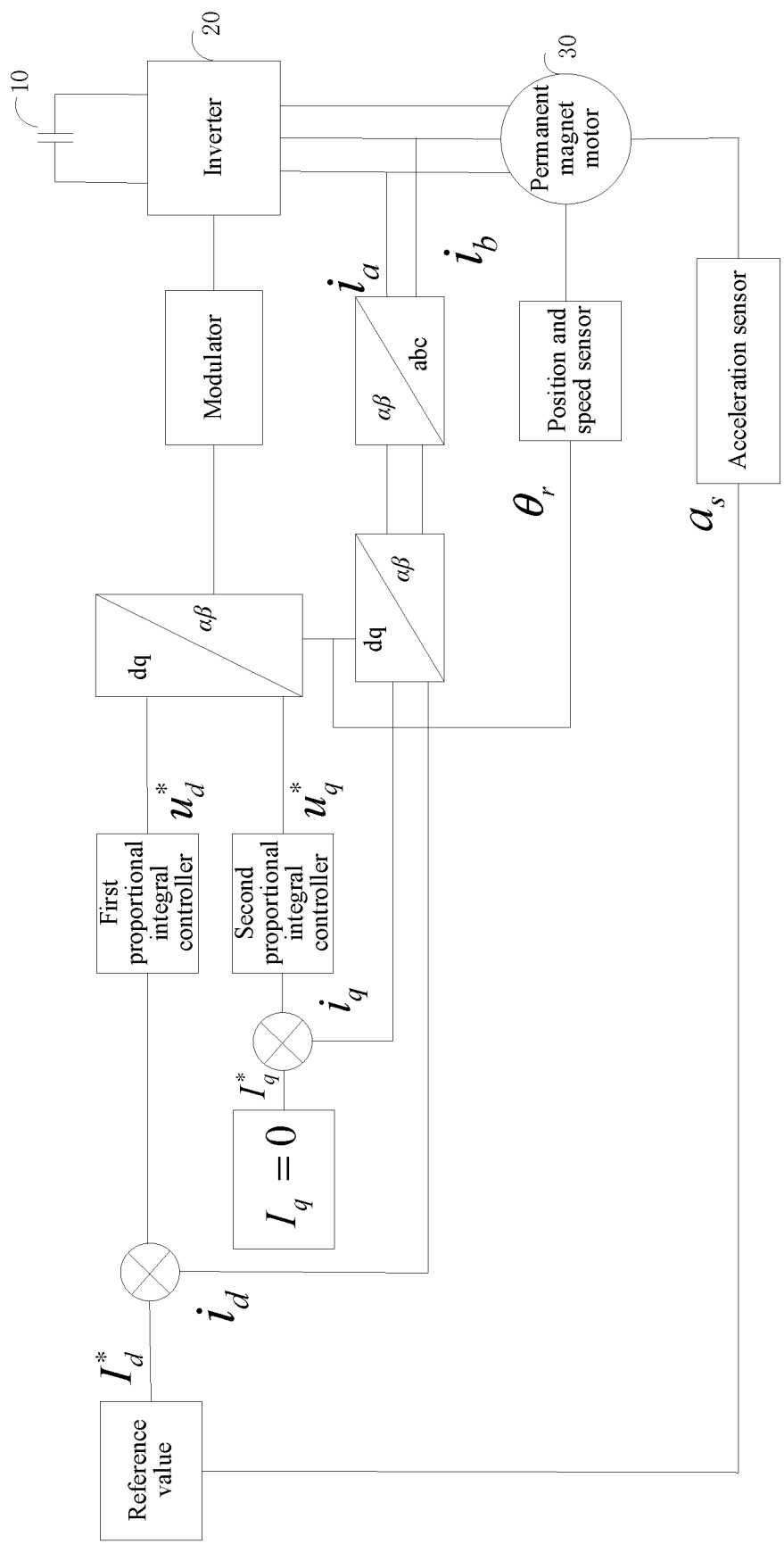
FIG. 4 is a flow chart of a vector control on a permanent magnet motor provided by an embodiment of the present disclosure.

Herein, as shown in FIG. 4, the motor parameters of the permanent magnet motor include an acceleration, a rotation speed, a position, and a stator current of the permanent magnet motor.

The MCU performs a coordinate conversion on the stator current according to the speed and position of the motor to obtain a d-axis real-time component of the stator current and a q-axis real-time component of the stator current of the permanent magnet motor.

The MCU then generates an input value of a first proportional integral controller according to the d-axis real-time component of the stator current, the acceleration of the permanent magnet motor, and the reference value of the d-axis component of the stator current. And the d-axis reference value of a stator voltage is output by the first proportional integral controller.

The MCU then generates an input value of a second proportional integral controller according to the q-axis real-time component of the stator current and the reference value of the q-axis component. And the q-axis reference value of the stator voltage is output by the second proportional integral controller.

The MCU then performs the coordinate conversion on the d-axis reference value of the stator voltage, the q-axis reference value of the stator voltage, the rotation speed and position of the motor to obtain the reference value of the stator voltage, and generates the first control signal according to the reference value of the stator voltage. The first control signal is a space vector pulse width modulation (SVPWM) signal.

In S305, when the VCU determines that the cell temperature satisfies the heating condition for the power battery, the VCU may send the heating instruction to the MCU, so that the MCU may send the first control signal to the inverter in response of receiving the heating instruction.

Figure 5:
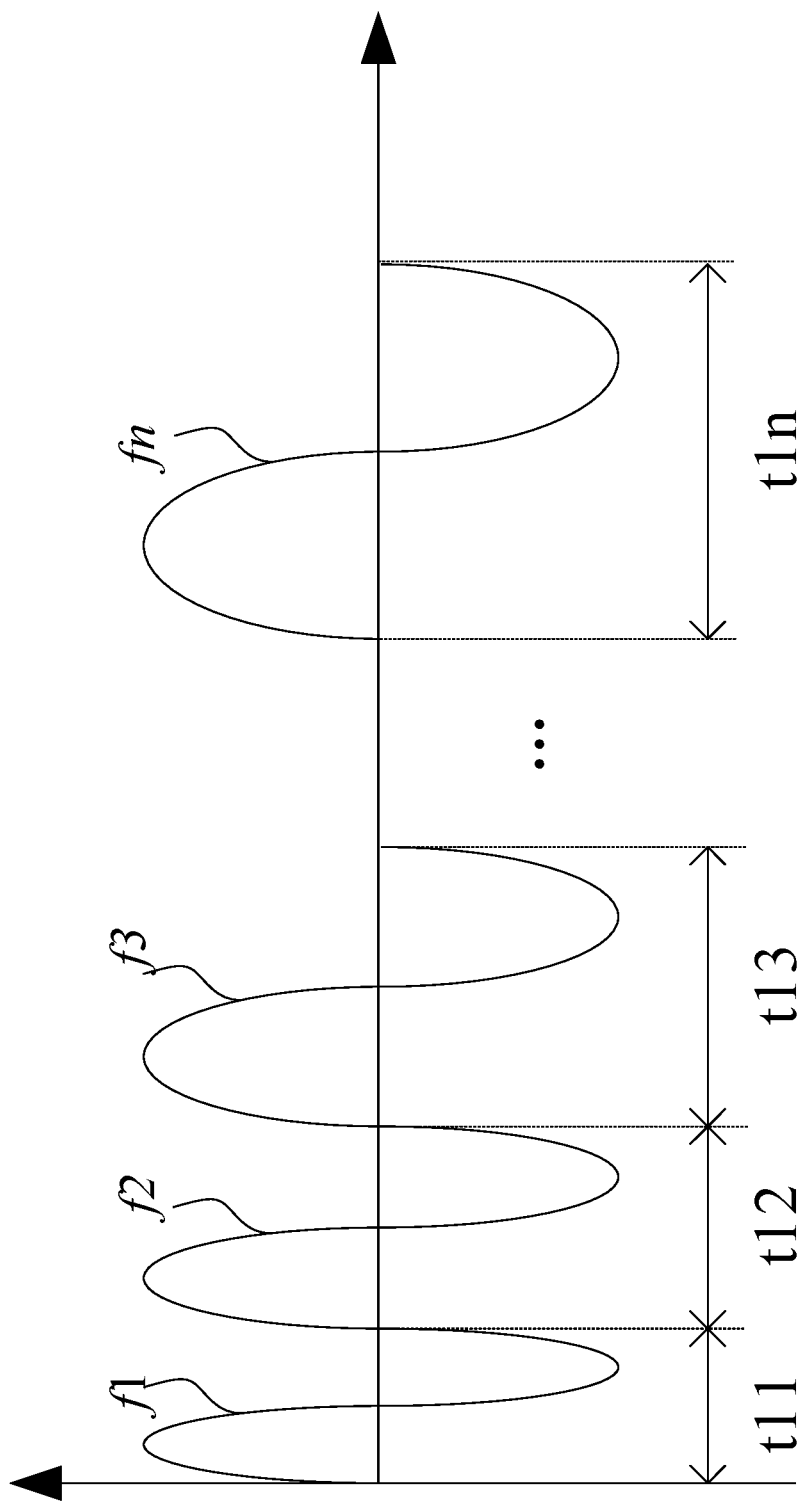
FIG. 5 is a schematic diagram of an alternating current for driving a motor provided by an embodiment of the present disclosure.

Herein, the first control signal is configured to control the inverter to convert a current provided by the power battery into an alternating current with a frequency changing random. As shown in FIG. 5, the frequency of the alternating current may be f1, f2, . . . , fn, the duration corresponding to the frequency f1 is t11, the duration corresponding to frequency f2 is t12, . . . , and the duration corresponding to the frequency fn is t1n, and the amplitude of the alternating current is I1.

The alternating current with the frequency changing random is configured to supply power to the permanent magnet motor, so that a self-heating may be obtained by the power battery by using its own resistance. The process of controlling the inverter to heat the power battery is described below.

Figure 6:
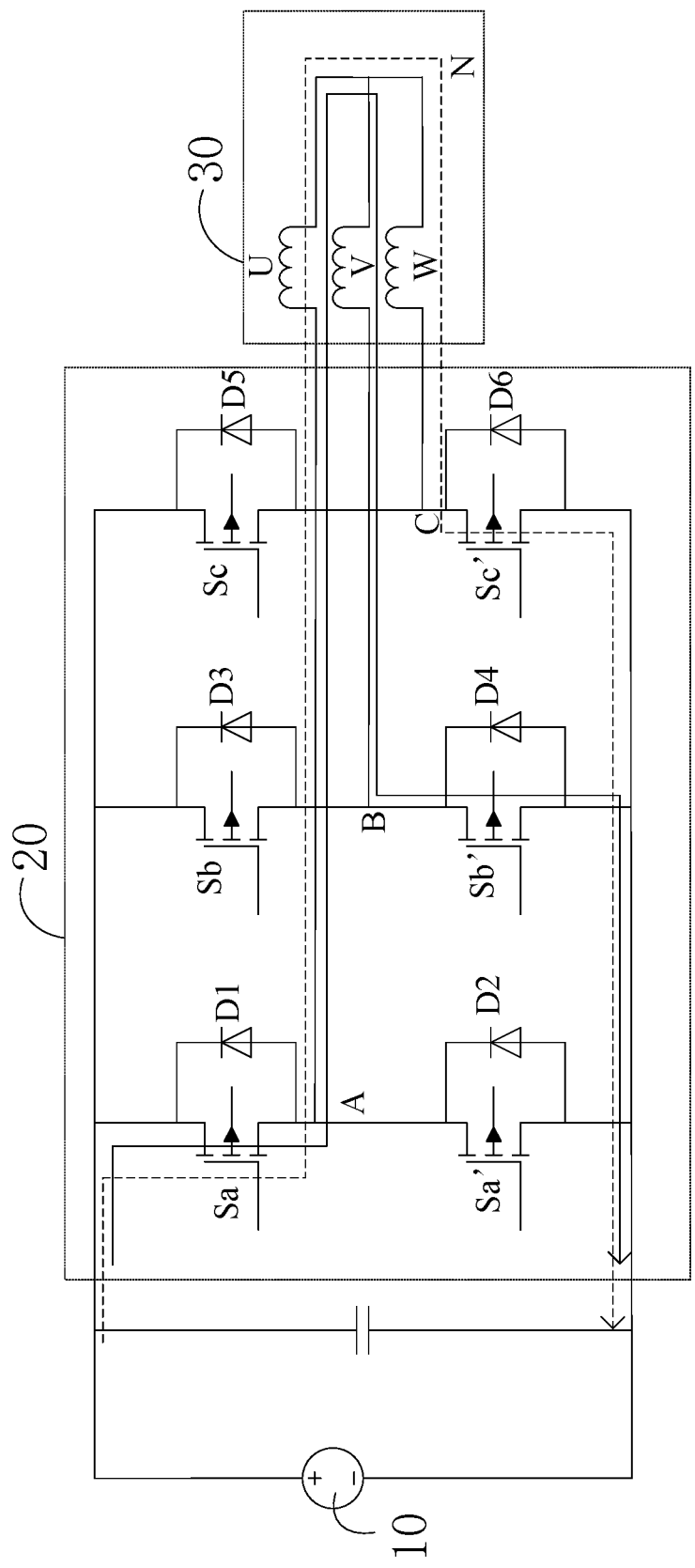
FIG. 6 is a schematic diagram of one of the operating states of the power system provided by an embodiment of the present disclosure.

As shown in FIG. 6, the first control signal controls the inverter, and the MCU drives and closes a power switch element Sa on a A-phase bridge arm, a power switch element Sb' on a B-phase bridge arm, and a power switch element Sc' on a C-phase bridge arm to form two discharge circuits. One of the discharge circuits is: power battery→Sa→stator winding U→stator winding V→Sb'→power battery, and the other discharge circuit is: power battery→Sa→stator winding U→stator winding W→Sc'→power battery. The power battery discharges and converts electrical energy into an electromagnetic energy on the three-phase stator winding, and an electronic rotor remains stationary, the stator winding stores energy, and a bus bar alternating current is obtained at both ends of a bus bar of the power battery to heat the battery.

Figure 7:
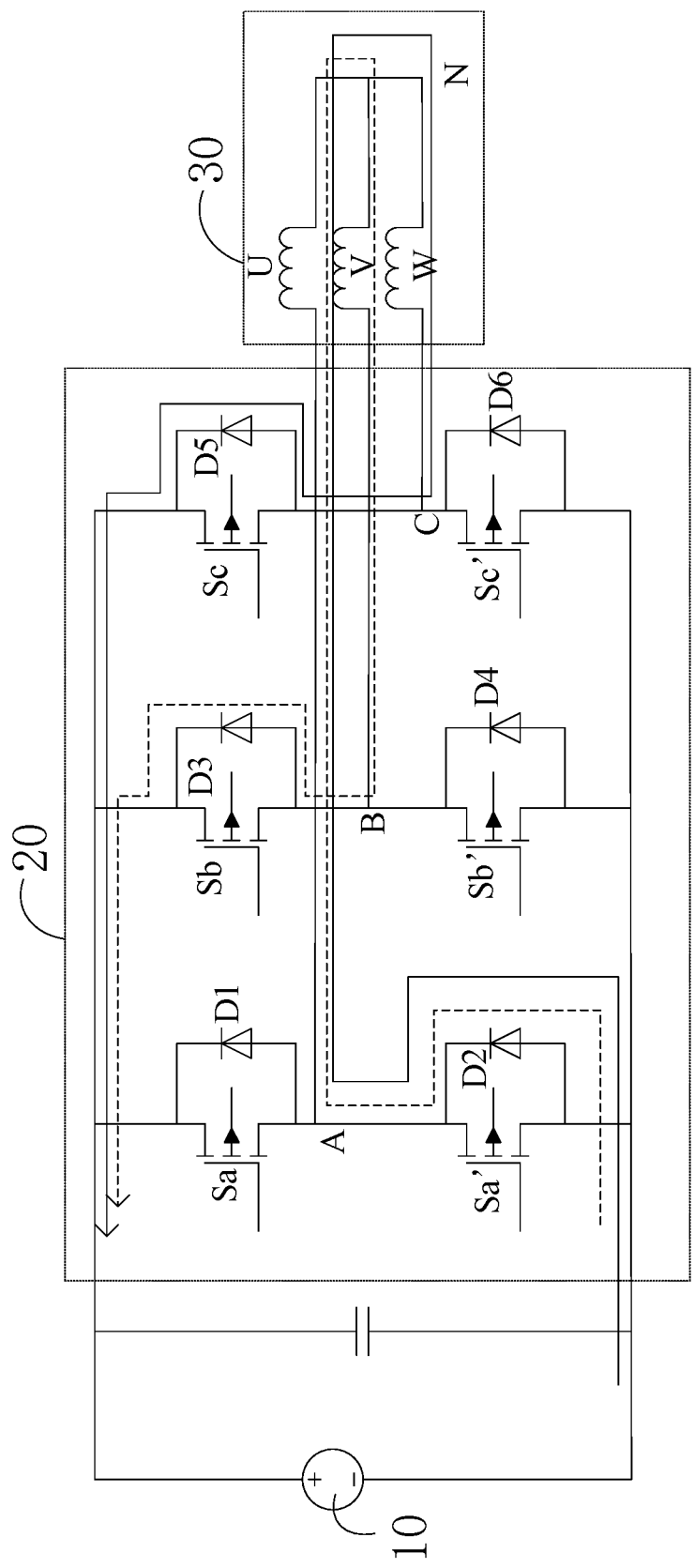
FIG. 7 is a schematic diagram of another operating state of the power system provided by an embodiment of the present disclosure.

At a next moment, the power switch element Sa on the A-phase bridge arm, the power switch element Sb' on the B-phase bridge arm, and the power switch element Sc' on the C-phase bridge arm are simultaneously switched off. Due to a characteristic that the current in the stator winding cannot change suddenly, the return current loops are shown in FIG. 7. The two return current loops are: power battery→diode D2→stator winding U→stator winding V→diode D3→power battery, and power battery→diode D2→stator winding U→stator winding W→diode D5→power battery. During a discharging and charging process of the stator winding in the motor, current flows through the power battery, thereby a battery pack can be heated.

A magnitude of a heating current in the discharge loop is determined by the closing timing of the power switch, that is, determined by a frequency f and a duty cycle D of the control signal configured to control the power switch element.

In the control method provided in this embodiment of the present disclosure, when the cell temperature of the power battery satisfies a self-heating condition for the battery, the plurality of set frequencies are randomly generated, and the duration corresponding to each of the plurality of set frequencies is determined according to the plurality of set frequencies. The first control signal is generated according to the plurality of set frequencies and durations, so that the inverter may convert the current provided by the power battery into the alternating current with the plurality of set frequencies. By introducing new frequency components, an originally concentrated radial electromagnetic force can be evenly distributed on the entire stator, in this way, vibration and noise during a heating process of the power battery can be reduce.

Another embodiment of the present disclosure provides a control method, the control method is applied to a power system shown in FIG. 1, and the control method includes the following steps.

In S401, a BMS obtains a cell temperature of a power battery.

Herein, a temperature sensor is deployed inside the power battery to monitor the cell temperature of the power battery in real time, and the temperature sensor may transmit a detected cell temperature to the BMS.

In S402, when a VCU determines that the cell temperature satisfies a heating condition for the power battery, the VCU may send a heating instruction to the MCU, so that the MCU may send a first control signal to an inverter in response of receiving the heating instruction.

Herein, when the cell temperature is lower than a minimum operating temperature, the first control signal is sent to the inverter. The first control signal is configured to control the inverter to convert a current provided by the power battery into an alternating current with a frequency changing randomly, and the alternating current with the frequency changing randomly is configured to supply power to a permanent magnet motor.

In S403, when an ambient temperature satisfies a preset heating condition for the power battery, the MCU sends a second control signal to the inverter.

Herein, when the cell temperature is lower than the minimum operating temperature, the second control signal is also sent to the inverter. The second control signal is configured to control the inverter to convert the current provided by the power battery into an alternating current with an amplitude changing periodically, and the alternating current with the amplitude changing periodically is configured to supply power to the permanent magnet motor.

Figure 8:
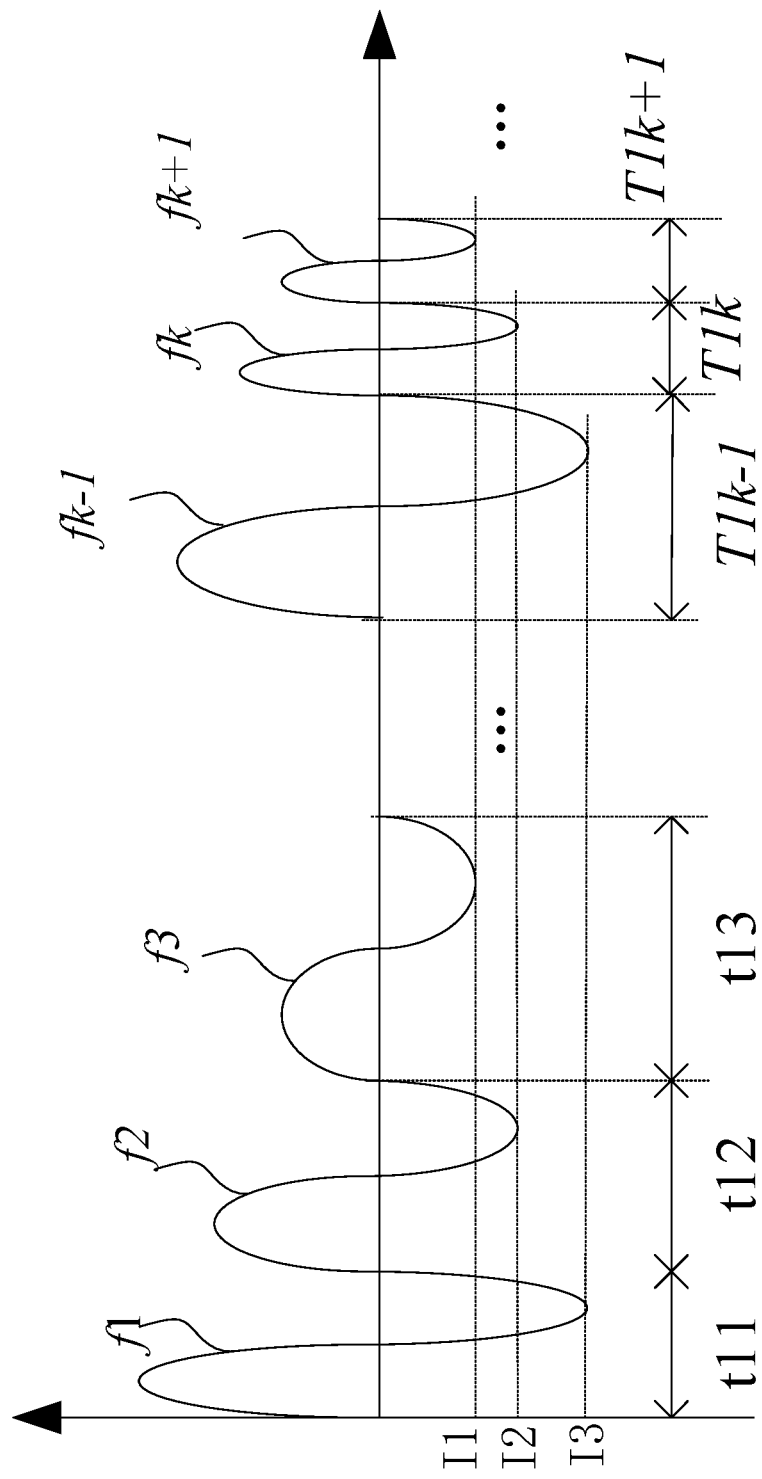
FIG. 8 is a schematic diagram of an alternating current for driving a motor provided by an embodiment of the present disclosure.

As shown in FIG. 8, under the controls of the first control signal and the second control signal, the inverter converts the current provided by the power battery into the alternating current with the amplitude changing periodically and the frequency changing randomly, so that a self-heating can be obtained by the power battery by using its own resistance.

In the control method provided in this embodiment of the present disclosure, when the cell temperature of the power battery satisfies a self-heating condition for the battery, the first control signal and the second control signal are generated so that the inverter converts the current provided by the power battery into the alternating current with the amplitude changing periodically and the frequency changing randomly. By introducing more frequency components, an originally concentrated radial electromagnetic force can be evenly distributed on entire stator, in this way, vibration noise during a heating process of the power battery can be greatly reduced.

Another embodiment of the present disclosure provides a control method, the control method is applied to a power system shown in FIG. 1, and the control method includes the following steps.

In S501, a BMS obtains a cell temperature of a power battery.

In S502, when a VCU determines that the cell temperature satisfies a heating condition for the power battery, the VCU may send a heating instruction to a MCU, so that the MCU generates a plurality of set frequencies randomly in response of receiving the heating instruction, and determines a duration of each of the plurality of set frequencies according to each of the plurality of set frequencies.

In S503, the MCU determines a reference value sequence of a d-axis component according to the plurality of set frequencies and the duration of each of the plurality of set frequencies, and sets a reference signal sequence of a q-axis component as a null sequence.

In S504, the MCU generates a first control signal according to the reference value sequence of the d-axis component, the reference value sequence of the q-axis component, and motor parameters of a permanent magnet motor.

In S505, the MCU sends the first control signal to an inverter.

Herein, S501 to S505 have been described in detail in the foregoing embodiments, and will not be repeated.

In S506, the MCU determines a plurality of set amplitudes and a duration of each of the plurality of set amplitudes according to heating parameters of the power battery and a maximum noise threshold value.

The heating parameters include a heating rate and a heating duration, and the maximum noise threshold value refers to a vibration noise threshold value of the motor. The greater a set amplitude, the longer a duration, the greater the heating rate, and the shorter the heating duration.

When the plurality of set amplitudes are determined, a current amplitude Id0 corresponding to a required heating rate under an operating condition with a constant amplitude and a constant frequency may be obtained, and the Id0 may be used as an average value of variable amplitudes to generate the plurality of set amplitudes. A number of the set amplitudes is not limited.

In S507, the MCU determines a reference value sequence of a d-axis component according to the plurality of set amplitudes and the duration of each of the plurality of set amplitude, and sets the reference value sequence of the q-axis component as the null sequence.

Herein, when the plurality of set amplitudes are I1, I2, . . . , In, the duration corresponding to the set amplitude I1 is t21, the duration corresponding to the set amplitude I2 is t22 . . . , and the duration corresponding to the set amplitude In is t2n.

The reference value sequence of the d-axis component includes a plurality of reference values, and each of the plurality of reference values includes an amplitude reference value component, a frequency reference value component, and a duration reference value component. The frequency reference value component may also be any value f1, the amplitude reference value component is a set amplitude, and the duration reference value component is a duration corresponding to the set amplitude. That is, the reference value sequence of the d-axis component is {(I1, f1, t21), (I2, f1, t22), . . . , (In, f1, t2n), (I1, f1, t21), (I2, f1, t22), . . . , (In, f1, t2n), . . . }.

The reference value sequence of the q-axis component includes a plurality of reference values, and each of the plurality of reference values includes the amplitude reference value component, the frequency reference value component, and the duration reference value component. The amplitude reference value component, frequency reference value component, and duration reference value component are all null. That is, the reference value sequence of the q-axis component is {(0, 0, 0), (0, 0, 0), . . . , (0, 0, 0)}.

In one embodiment, the amplitude reference value in the reference value sequence of the d-axis component increases or decreases sequentially, that is, I1≤I2 . . . ≤In, or I1≥ I2 . . . ≥In. By using an alternating current with a periodically increasing amplitude or a periodically decreasing amplitude to supply power to the motor, more frequency components can be introduced, and an originally concentrated radial electromagnetic force can be evenly distributed on entire stator, in this way, the vibration and noise during a heating process of the power battery can be greatly reduced.

In S508, the MCU generates a second control signal according to the reference value sequence of the d-axis component, the reference value sequence of the q-axis component, and the motor parameters of the permanent magnet motor.

Herein, the motor parameters of the permanent magnet motor include a position, a speed, an acceleration, and a stator current of the motor, and the manner of generating the second control signal is the same as that described in FIG. 4, and will not be repeated here.

In S509, when an ambient temperature satisfies a preset heating condition for the power battery, the MCU may send the second control signal to the inverter.

Herein, when the cell temperature is lower than a minimum operating temperature, the second control signal is also sent to the inverter. The second control signal is configured to control the inverter to convert a current provided by the power battery into an alternating current with an amplitude changing periodically, and the alternating current with the amplitude changing periodically is configured to supply power to the permanent magnet motor.

An amplitude changing cycle of the alternating current is:

$$T=t_{21}+t_{22}+\ldots+t_{2n}.$$

In the control method provided in this embodiment of the present disclosure, when the cell temperature of the power battery satisfies a self-heating condition for the battery, the plurality of set frequencies are randomly generated, and the duration corresponding to each of the plurality of set frequencies is determined according to the plurality of set frequencies, so as to generate the first control signal according to the plurality of set frequencies and the durations. The plurality of set amplitudes and the duration of each of the plurality of set amplitudes are determined according to the heating parameters of the power battery and the maximum noise threshold value, so that the second control signal is generated according to the plurality of set amplitudes and the durations. Under the controls of the first control signal and the second control signal, the inverter converts the current provided by the power battery into the alternating current with the frequency changing random and the amplitude changing periodically. By introducing more frequency components, the originally concentrated radial electromagnetic force can be evenly distributed on the entire stator, in this way, the vibration noise during the heating process of the power battery can be greatly reduce.

Figure 9:
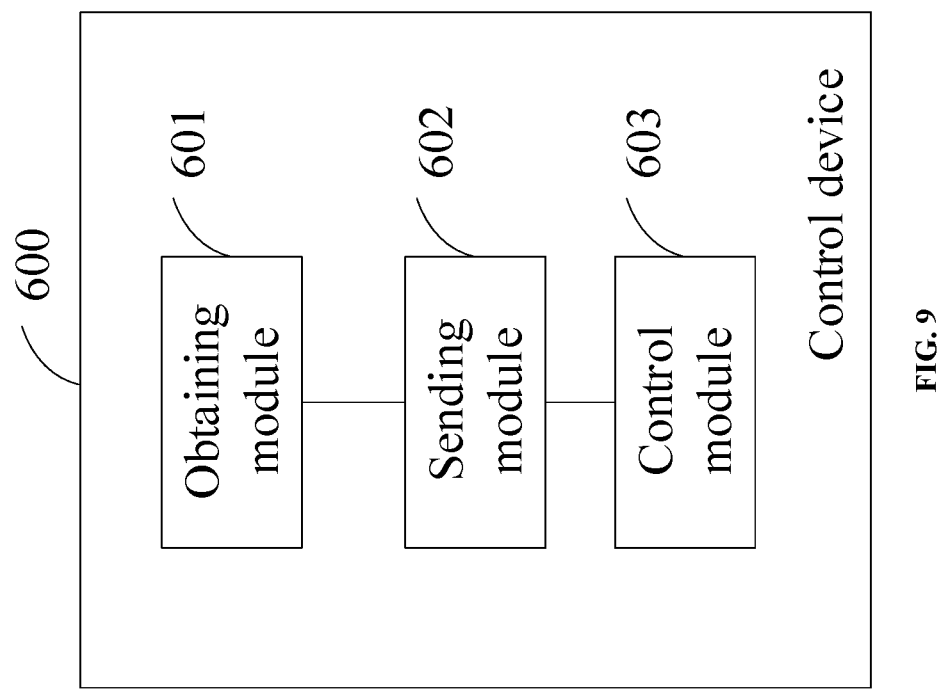
FIG. 9 is a schematic structural diagram of a control device provided by an embodiment of the present disclosure.

As shown in FIG. 9, the present disclosure provides a control device 600, the control device 600 is configured to send a first control signal to an inverter when a cell temperature of a power battery satisfies a preset heating condition for the power battery. Herein, the first control signal is configured to control the inverter to convert an electricity provided by the power battery into an alternating current with a frequency changing randomly, and the alternating current with frequency changing randomly is configured to supply power to a motor.

In one embodiment, the control device 600 includes:
an obtaining module 601, configured to obtain the cell temperature of the power battery.
a sending module 602, configured to send a heating instruction to a control module 603 when the cell temperature satisfies the preset heating condition for the power battery.
the control module 603, configured to send the first control signal to the inverter in response of receiving the heating instruction, where the first control signal is configured to control the inverter to convert the current provided by the power battery into the alternating current with the frequency changing randomly, and the alternating current with the frequency changing randomly is configured to supply power to a permanent magnet motor.

In some embodiments, the control module 603 is further configured to: randomly generate a plurality of set frequencies, and determine a duration of each of the plurality of set frequencies according to each of the plurality of set frequencies; determine a reference value sequence of a d-axis component according to the plurality of set frequencies and the duration of each of the plurality of set frequencies, and set a reference signal sequence of a q-axis component as a null sequence; and generate the first control signal according to the reference value sequence of the d-axis component, the reference value sequence of the q-axis component, and motor parameters of the permanent magnet motor.

In some embodiments, the control module 603 is specifically configured to: determine an entire cycle duration corresponding to a set frequency as a duration of the set frequency; or, determine a half cycle duration corresponding to a set frequency as a duration of the set frequency.

In some embodiments, the sending module 602 is also configured to: send a second control signal to the inverter when the cell temperature of the power battery satisfies the preset heating condition for the power battery, where the second control signal is configured to control the inverter to convert the electricity provided by the power battery into an alternating current with an amplitude changing periodically, and the alternating current with the amplitude changing periodically is configured to supply power to the permanent magnet motor.

In some embodiments, the control module 603 is further configured to: determine a plurality of set amplitudes and a duration of each of the plurality of set amplitudes according to heating parameters of the power battery and a maximum noise threshold value; determine a reference value sequence of a d-axis component according to the plurality of set amplitudes and the duration of each of the plurality of set amplitudes, and set a reference value sequence of a q-axis component as a null sequence; and generate the second control signal according to the reference value sequence of the d-axis component, the reference value sequence of the q-axis component, and motor parameter of the motor.

In some embodiments, the heating parameters include a heating rate and a heating duration.

In some embodiments, an amplitude reference value in the reference value sequence of the d-axis component is periodically increased or periodically decreased.

In some embodiments, the control module 603 is also configured to determine whether the cell temperature is less than a minimum operating temperature of the power battery.

An embodiment of the present disclosure provides a power system, including: a power battery, an inverter, a motor, and a motor controller. The motor controller is respectively configured to perform the steps in the control methods described in the above embodiments. However, a changing in frequency may induce a large amount of eddy current loss in the stator, a rotor core and a permanent magnet of the motor, which causes the motor to generate a large amount of heat. A heat sink may be added to the motor to avoid the motor from burnt out.

An embodiment of the present disclosure provides an electric vehicle, including a power system. The power system includes a power battery, an inverter, a motor, and a motor controller. The motor controller is respectively configured to perform the steps in the control methods described in the above embodiments.

Although the present disclosure has been described with reference to some embodiments, without departing from the scope of the present disclosure, various improvements may be made to it and the components therein may be replaced with equivalents. In particular, as long as there is no structural conflict, the various technical features mentioned in the various embodiments may be combined in any manner. The present disclosure is not limited to the specific embodiments disclosed in the text, but includes all technical solutions falling within the scope of the claims.

What is claimed is:

1. A control method being applied to a power system, wherein the power system comprises a power battery, a motor, and an inverter, the method comprising:
obtaining a battery cell temperature of the power battery; and
sending a first control signal to the inverter when the battery cell temperature of the power battery satisfies a preset heating condition for the power battery;
wherein the first control signal is configured to control the inverter to convert an electricity provided by the power battery into an alternating current with a randomly changing frequency, and the alternating current with the randomly changing frequency is configured to supply power to the motor;
wherein before the sending the first control signal, the method further comprises:
randomly generating a plurality of set frequencies, and determining a duration of each of the plurality of set frequencies according to each of the plurality of set frequencies;
determining a reference value sequence of a d-axis component according to the plurality of set frequencies and the duration of each of the plurality of set frequencies, and setting a reference signal sequence of a q-axis component as a null sequence; and
generating the first control signal according to the reference value sequence of the d-axis component, the reference value sequence of the q-axis component, and motor parameters of the motor.

2. The method according to claim 1, wherein the determining the duration of each of the plurality of set frequencies according to each of the plurality of set frequencies comprises:
   determining an entire cycle duration corresponding to a set frequency as a duration of the set frequency; or
   determining a half cycle duration corresponding to a set frequency as a duration of the set frequency.

3. The method according to claim 1, wherein the method further comprises:
   sending a second control signal to the inverter when the battery cell temperature of the power battery satisfies the preset heating condition for the power battery;
   wherein the second control signal is configured to control the inverter to convert the electricity provided by the power battery into an alternating current with an amplitude changing periodically, and the alternating current with the amplitude changing periodically is configured to supply power to the motor.

4. The method according to claim 3, wherein, before the sending the second control signal, the method further comprises:
   determining a plurality of set amplitudes and a duration of each of the plurality of set amplitudes according to heating parameters of the power battery and a maximum noise threshold value;
   determining a reference value sequence of a d-axis component according to the plurality of set amplitudes and the duration of each of the plurality of set amplitudes, and setting a reference value sequence of a q-axis component as a null sequence; and
   generating the second control signal according to the reference value sequence of the d-axis component, the reference value sequence of the q-axis component, and motor parameters of the motor.

5. The method according to claim 4, wherein the heating parameters comprise a heating rate and a heating duration.

6. The method according to claim 4, wherein an amplitude reference value in the reference value sequence of the d-axis component is periodically increased or periodically decreased.

7. A power system, comprising: a power battery, an inverter, a motor, and a motor controller, wherein the motor controller is configured to perform the control method according to claim 1.

* * * * *